United States Patent
Tseng et al.

(10) Patent No.: US 7,111,107 B2
(45) Date of Patent: Sep. 19, 2006

(54) MICROCONTROLLER WITH DEDICATED MEMORY BANK FOR SERVICING INTERRUPTS

(75) Inventors: Pao-Ching Tseng, Taipei (TW); Ping-Cheng Sung, Hsin-Chu (TW); Ping-Sheng Chen, Chia-Yi Hsien (TW); Li-Chun Tu, Taipei (TW)

(73) Assignee: MediaTek Inc., Hsin-Chu Hsien (TW)

( * ) Notice: Subject to any disclaimer, the term of this patent is extended or adjusted under 35 U.S.C. 154(b) by 369 days.

(21) Appl. No.: 10/707,107

(22) Filed: Nov. 20, 2003

(65) Prior Publication Data

US 2004/0186944 A1   Sep. 23, 2004

(30) Foreign Application Priority Data

Mar. 21, 2003  (TW) .............................. 92106402 A

(51) Int. Cl.
    *G06F 12/00* (2006.01)
    *G06F 11/07* (2006.01)
(52) U.S. Cl. .............................. 711/5; 711/154; 714/34; 714/35
(58) Field of Classification Search ..................... None
    See application file for complete search history.

(56) References Cited

U.S. PATENT DOCUMENTS

| 5,682,310 | A | | 10/1997 | Pedneau et al. |
| 5,913,924 | A | * | 6/1999 | Zhou et al. .................. 711/212 |
| 6,260,101 | B1 | * | 7/2001 | Hansen et al. .................. 711/5 |
| 6,438,672 | B1 | * | 8/2002 | Fischer et al. .............. 711/210 |
| 6,453,417 | B1 | * | 9/2002 | Milios et al. .................. 726/27 |

FOREIGN PATENT DOCUMENTS

CN   1015495 B   2/1992

* cited by examiner

*Primary Examiner*—T Nguyen
(74) *Attorney, Agent, or Firm*—Winston Hsu

(57) ABSTRACT

A microcontroller with expandable memory banks has a microprocessor, a plurality of memory banks with only one page for storing interrupt service routines(ISR), a memory bank control circuit connected to the microprocessor, and a multiplexer for connecting the microprocessor with the plurality of memory banks. The memory bank control circuit generates a selection signal according to an interrupt signal and a microprocessor interrupt service routine execution end signal. The multiplexer outputs a page selection signal from the microprocessor or outputs a predetermined page selection signal according to the output signal from the memory bank control circuit.

22 Claims, 3 Drawing Sheets

Fig. 2

MICROCONTROLLER WITH DEDICATED MEMORY BANK FOR SERVICING INTERRUPTS

BACKGROUND OF INVENTION

1. Field of the Invention

The invention relates to a method for managing a program memory and more particularly, to a method for managing an external program memory of a microprocessor.

2. Description of the Prior Art

Intel Corporation generally refers to a microprocessor as an MCS (Micro Computer System) and the MCS-51/52 series microprocessor developed by the Intel Corporation is commonly used in industry. Generally speaking, a microprocessor comprises a small memory and a few I/O ports. Take the MCS-51 microprocessor for example; it comprises a program memory of 4K bytes, a data memory of 128 bytes, and 32 I/O ports. The MCS-52 series microprocessor comprises a program memory of 8K bytes and a data memory of 256bytes. The MCS-51/52 series of microprocessors features an 8-bit CPU. The program memory is a read-only memory (ROM) for storing a program written by a user. The data memory is a random-access memory for storing data temporarily while the CPU executes a program. The capacity of the memory of the MCS-51/52 series microprocessor can be externally expanded to 64K bytes.

An external program memory with capacity of 64K bytes is still not large enough if the user needs to write lengthy code or use a large array table. To solve this problem, the capacity of the external program memory of the microprocessor can be substantially expanded by switching a plurality of memory banks when the user uses the extra pins of the microprocessor as decode lines to set an address for an external program memory with capacity of over 64K bytes. If the external program memory is one memory device with large capacity, the extra pins of the microprocessor can be address lines. If there are several external program memory devices with smaller capacity, the extra pins of the microprocessor can be used to select the memory chips. Because the largest capacity of the external program memory of the microprocessor is 64K bytes, 64k bytes can be taken as a unit (a page) when the microprocessor switches the memory banks. Further, an interrupt vector table is usually stored at a specific address of the external program memory, and the microprocessor searches for the interrupt vector table at the specific address in a current page immediately when an interrupt occurs. Because the microprocessor cannot switch the plurality of memory banks when the interrupt occurs, an error occurs when the microprocessor cannot find the interrupt vector table in the current page. To solve this problem, a common area in each memory bank is reserved for storing the interrupt vector table, interrupt service routines, common program library, and a memory bank switching routine, etc. This ensures that the microprocessor can find the interrupt vector table in the current page (can be any page) and, when the interrupt is served, continue executing the interrupted program.

FIG. 1 is a diagram of an external program memory 12 according to the prior art. The capacity of the external program memory 12 of the MCS-51/52 series microprocessor is expanded to 512K bytes by switching the plurality of memory banks. The external program memory 12 is divided into 8 pages. The capacity of each page is 64K bytes but a common area in each page with certain capacity (ex. 10K bytes)is reserved for storing the interrupt vector table, the interrupt service routines, the common program library, and the memory bank switching routine, etc. For example, when the microprocessor has to execute a program B in page 2 while executing a program A in page 1, it will call the bank switching routine in the common area. The memory bank switching routine stored in the common area will set the page number to 2, then the microprocessor can access the program B in page 2. After executing the program in the page 2, the microprocessor will return to the program A by calling the bank switching routine in the common area, and the memory bank switching routine will switch the page number from 2 to 1, so the microprocessor can return to the address of the program A in page 1 to continue executing the program A. Further, when the interrupt occurs, the microprocessor accesses the interrupt vector table stored in the common area to access and execute the interrupt service routines according to the content of the interrupt vector table. The microprocessor then comes back to the original address of the program to continue executing the interrupted program. The interrupt service routines and the interrupt vector table are stored in the common area of each page, thus, when accessing the interrupt service routines and the interrupt vector table, it is not necessary to switch the pages.

According to the foregoing description, though the largest capacity of the external program memory of the MCS-51/52 series microprocessor is 64K bytes, the external program memory can be further expanded by switching the plurality of memory banks when using the extra pins of the microprocessor as the decode lines to set the address of the external program memory with capacity of over 64K bytes. However, each memory bank has to reserve a certain space for the common area to store the interrupt vector table, the interrupt service routines, the common program library, and the memory bank switching routine, etc. These multiple common areas mean the space of the external program memory is not used efficiently.

SUMMARY OF INVENTION

It is therefore a primary objective of the claimed invention to provide a method for managing an external program memory of a microprocessor to solve the above-mentioned problem.

According to the claimed invention, a microcontroller with expandable memory banks comprises a microprocessor, a plurality of memory banks, which have a storage space that is larger than the addressing capability space of the microcontroller, connected to the microprocessor for storing data, programs and interrupt service routines in one of the memory banks, a memory bank control circuit, and a multiplexer for connecting the microprocessor with the plurality of memory banks. The multiplexer comprises a first input connected to an output of the microprocessor for bank switching during normal operation, a second input connected to a predetermined value corresponding to the memory bank storing the interrupt service routines, and a selecting port for receiving a selection signal generated by the memory bank control circuit. The memory bank control circuit generates the selection signal according to an interrupt signal and a microprocessor interrupt service routine execution end signal. The multiplexer switches to output a page selection signal from the output of the microprocessor or a predetermined page selection signal according to the selection signal so that the microprocessor can access the interrupt service routines when the interrupt occurs.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 2 is a diagram of an external program memory allocation of a microprocessor according to a present invention.

DETAILED DESCRIPTION

Figure 2:
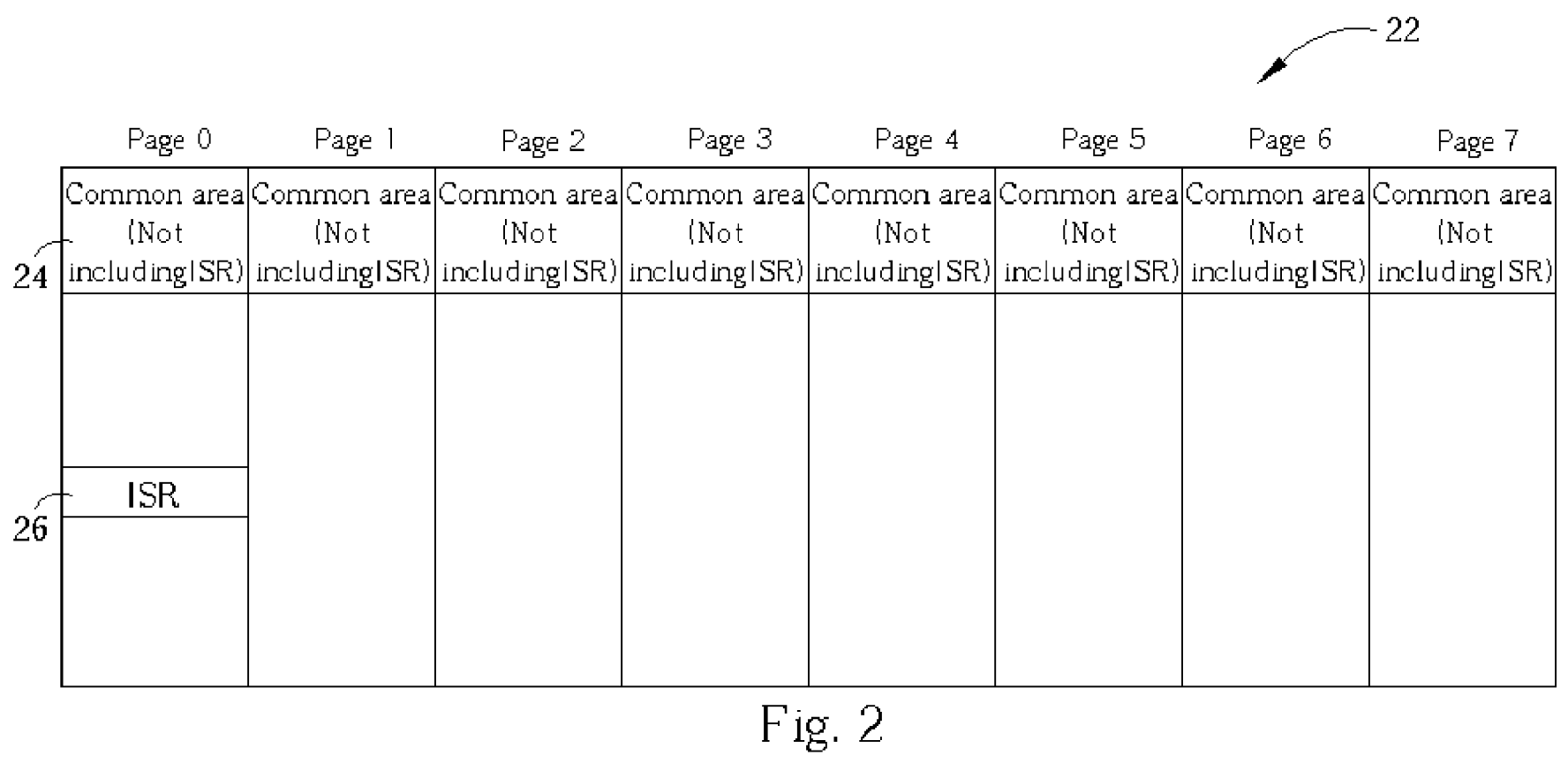

FIG. 2 is a diagram of the arrangement of a plurality of memory pages in an external program memory 22 according to the present invention. In the prior art previously described, the multiple common areas mean the space of the external program memory 22 is not used efficiently. To decrease the space occupied by the common area, the present invention omits the interrupt service routines from each common area 24 in each memory page and only stores interrupt service routines 26 in one of the memory pages in the external program memory 22. When an interrupt occurs, the microprocessor switches to the memory page storing the interrupt service routines 26 to access the interrupt service routines 26.

Because the space occupied by the common area in each memory page is reduced, the storage space of each memory page becomes larger, and the memory pages will be switched less frequently. For instance, the capacity of the external program memory 22 is 512K bytes. The external program memory 22 is divided into 8 pages. The capacity of each page is 64K bytes but a common area in each page with capacity of 10K bytes is reserved. Assume the total size for the interrupt service routines is 4K bytes. Then if only page 0 of the memory bank stores the interrupt service routines 26, the capacity of each memory page (except page 0 of the memory bank) is increased from 54K bytes to 58K bytes and the total increased capacity is 28K (4K*(8−1)=28K). When the interrupt occurs, a CPU of the microprocessor pushes the current program counter address and a page number of the current memory page onto a stack, and then switches the current memory page to page 0 of the external program memory 22 to execute the interrupt service routines. The present invention uses the memory bank control circuit and the multiplexer to switch the microprocessor to page 0 of the memory bank to execute the interrupt service routines when the microprocessor is interrupted. The multiplexer and a microprocessor interrupt service routine execution end signal are used to omit the interrupt service routines from each common area 24 in each memory page and only stores the interrupt service routines 26 in one of the memory pages in the external program memory 22.

Figure 1:
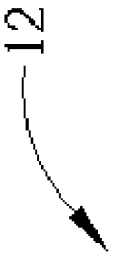
FIG. 1 is a diagram of an external program memory allocation according to a prior art.
Figure 3:
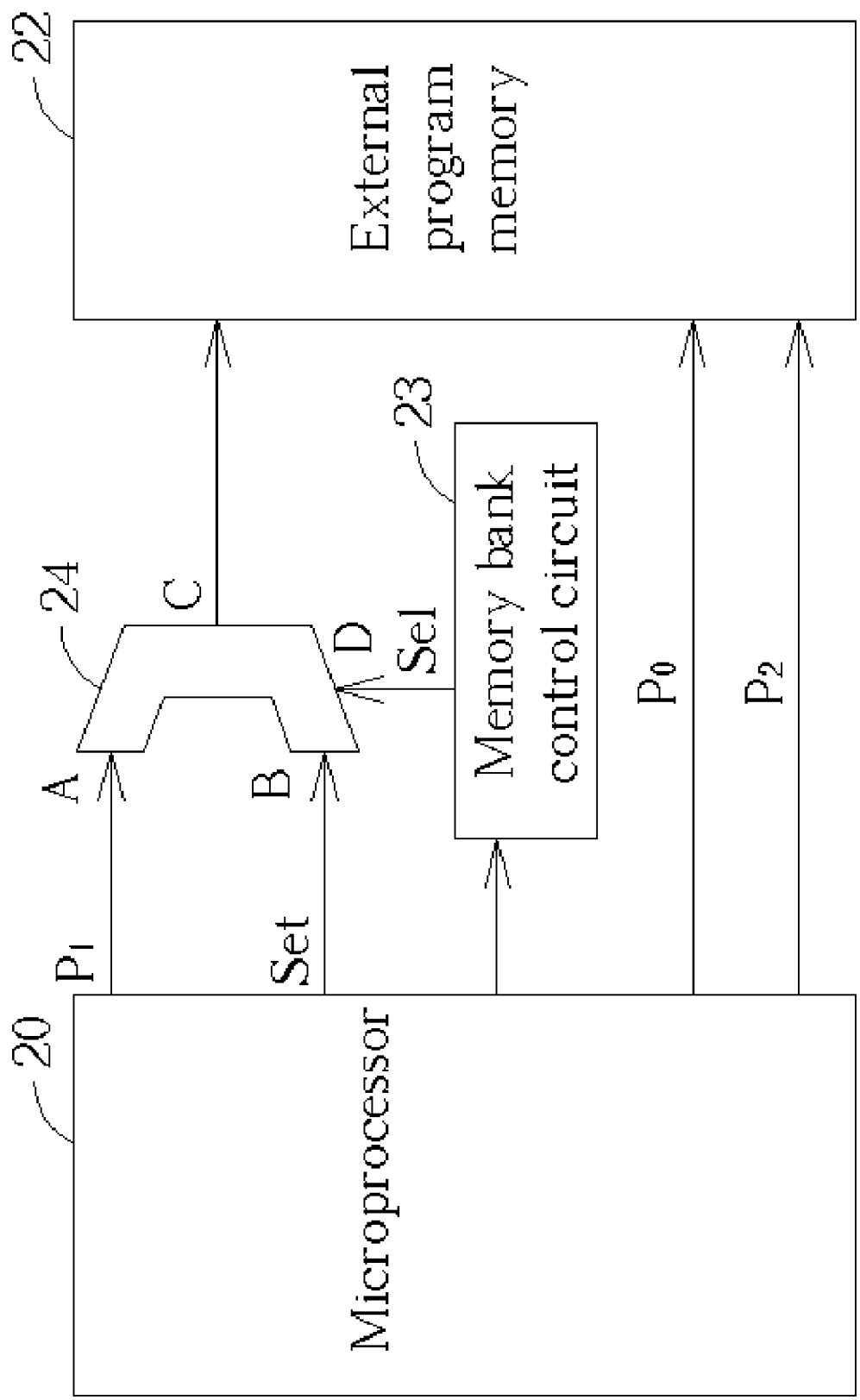
FIG. 3 is a diagram of the microprocessor connected to the external program memory of FIG. 2.

FIG. 3 is a diagram of a microprocessor 20 connected to the external program memory 22 according to the present invention. A port P0 and a port P2 directly connected to the external program memory 22 are used to set addresses and access the memory banks of the external program memory 22. A port P1 of the microprocessor is connected to the external memory 22 via a multiplexer 24, which comprises an input A, an input B, an output C, and a selecting input D. The input A of the multiplexer 24 connected to the port P1 of the microprocessor 20 is used to input a page number of the external program memory 22 by the microprocessor 20. The input B of the multiplexer 24 is connected to a predetermined page number signal ("Set" shown in FIG. 3), wherein the predetermined page number signal is the page number of the memory page storing the interrupt service routines. The output C of the multiplexer 24 is connected to the external program memory 22, and is used to select the page of the external program memory 22. The selecting input D of the multiplexer 24 is connected to an output ("Sel" shown in FIG. 3) of a memory bank control circuit 23. The memory bank control circuit 23 outputs a logic low signal if the microprocessor is not executing interrupt service routines. The multiplexer 24 outputs a page number signal from the input A according to the logic low signal so that the microprocessor 20 can switch and access the memory pages of the external program memory 22 normally. When the microprocessor 20 receives an interrupt request while executing a program, the memory bank control circuit 23 will raise the output signal to a logic high. Hence, the multiplexer 24 outputs the predetermined page number signal from the input B so that the microprocessor 20 will be switched to the memory page storing the interrupt service routines and execute the interrupt service routines. Because when an interrupt occurs the microprocessor 20 cannot switch the memory page and can only execute a program in the memory page storing the interrupt service routines, a user has to store a program, which is called while the microprocessor 20 executes the interrupt service routines, and the interrupt service routines in the same memory bank.

According to the foregoing description, the present invention omits the interrupt service routines from the common area in each memory page and only stores interrupt service routines in one of the memory pages in the external program memory 22. When the microprocessor 20 switches the memory banks of the external memory 22, the multiplexer 24 connects the port P1 (a page selector) of the microprocessor 20 to the external program memory 22. Further, the memory bank control circuit 23 selects a page number signal outputted to the external program memory 22 from the multiplexer 24 according to the interrupt signal and the microprocessor interrupt service routine execution end signal. When the memory bank control circuit 23 outputs the logic low signal, the multiplexer 24 outputs the page number signal driven by the microprocessor. When the memory bank control circuit 23 outputs the logic high signal, the multiplexer 24 outputs the predetermined page number signal so that the microprocessor 20 can switch to the memory bank storing the interrupt service routines and execute the interrupt service routines.

In contrast to the prior art, the microprocessor 20 can use the multiplexer to switch the memory page when the interrupt occurs so that the interrupt service routines can be omitted from each common area 24 in each memory page. Because the space occupied by the common area in each memory page is reduced, the effective storage space of each memory page is larger, and the memory pages will be switched less frequently. The prior art has to reserve a certain quantity of space in each memory bank for the common area comprising the interrupt service routines when expanding the capacity of the external program memory using switched memory pages. These multiple common areas mean the space of the external program memory is not used efficiently. Compared with the prior art, the present invention uses the storage space of the external memory more efficiently.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A microcontroller with expandable memory banks, the microcontroller comprising:
a microprocessor;
a plurality of memory banks connected to the microprocessor for storing data, programs;
a memory bank control circuit connected to the microprocessor for asserting a signal during the processing of an interrupt event; and
a multiplexer for connecting the microprocessor with the plurality of memory banks, the multiplexer comprising:
a first input connected to an output of the microprocessor for bank switching during the normal operation;
a second input connected to a predetermined value corresponding to the memory bank storing the interrupt service routines; and
a selecting port connected to an output of the memory bank control circuit for selecting whether to output an page selection signal from the output of the microprocessor or an predetermined page selection signal, wherein the microprocessor can access data stored in the memory bank storing the interrupt service routines when the interrupt occurs.

2. The microcontroller of claim 1 wherein the microprocessor is an MCS series microprocessor.

3. The microcontroller of claim 1 wherein the plurality of memory banks are expandable and have a storage space larger than a command addressing capacity of the microcontroller.

4. The microcontroller of claim 1 wherein the multiplexer further comprises extra input for a different predetermined page selection signal corresponding to the memory bank storing different interrupt service routines.

5. The microcontroller of claim 1 wherein the memory bank control circuit generates a selection signal according to one of different interrupt sources.

6. The microcontroller of claim 1 wherein each memory bank comprises a common area that does not comprise the interrupt service routines.

7. The microcontroller of claim 1 wherein any program called by the interrupt service routine and the interrupt service routine are stored in die same memory bank.

8. A method for accessing a memory connected to a microprocessor, wherein the memory comprises a plurality of memory banks, the method comprising:
(a) storing interrupt service routines in only one of the plurality of memory banks;
(b) when an interrupt of the microprocessor does not occur, selecting and accessing a memory bank according to a page selection signal output by the microprocessor; and
(c) when an interrupt of the microprocessor occurs, immediately selecting and accessing the memory bank storing the interrupt service routines according to a predetermined page selection signal output by the microprocessor.

9. The method of claim 8 wherein the microprocessor is an MCS series microprocessor.

10. The method of claim 8 further comprises storing a common area not comprising the interrupt service routines in each memory bank.

11. The method of claim 8 further comprises storing a program called by the interrupt service routines in the same memory bank with the interrupt service routines.

12. A microcontroller with expandable memory banks, the microcontroller comprising:
a microprocessor for asserting a page selection signal, asserting a predetermined value corresponding to a memory bank storing an interrupt service routine, and asserting an interrupt signal when an interrupt occurs;
a plurality or memory banks coupled to the microprocessor for storing data and programs, and further for storing the interrupt service routine in only one of the memory banks;
a multiplexer coupled between the microprocessor and the plurality of memory banks for outputting a selection signal to the plurality of memory banks, the multiplexer comprising:
a first input coupled to the page selection signal for bank switching during normal operation;
a second input coupled to the predetermined value corresponding to the memory hank storing the interrupt service routine; and
a selecting port for switching between one of the page selection signal or the predetermined value to be outputted from the multiplexer as the selection signal; and
a memory bank control circuit coupled between the interrupt signal and the selecting port, the memory bank control circuit for controlling the multiplexer to select the predetermined value as the selection signal when the interrupt signal is asserted, and to select the page selection signal as the selection signal when the interrupt signal is not asserted;
wherein the plurality of memory banks is further for allowing the microprocessor to access a particular memory bank according to the selection signal.

13. The microcontroller of claim 12 wherein the microprocessor is an MCS series microprocessor.

14. The microcontroller of claim 12 wherein the plurality of memory banks are expandable and have a storage space larger than a command addressing capacity of the microcontroller.

15. The microcontroller of claim 12 wherein the multiplexer further comprises an extra input for a different predetermined page selection signal corresponding to a memory bank storing a different interrupt service routine.

16. The microcontroller of claim 12 wherein the memory bank control circuit selects the selection signal according to one of different interrupt sources.

17. The microcontroller of claim 12 wherein each memory bank comprises a common area that does not comprise the interrupt service routine.

18. The microcontroller of claim 12 wherein any program called by the interrupt service routine and the interrupt service routine arc stored in the same memory bank.

19. A method for accessing a plurality of memory banks, the method comprising:
providing a microprocessor for asserting a page selection signal, asserting a predetermined value corresponding to a memory bank storing an interrupt service routine, and asserting an interrupt signal when an interrupt occurs;
storing the interrupt service routine into only one of the memory banks;

selecting the predetermined value as a selection signal when the interrupt signal is asserted, and selecting the page selection signal as the selection signal when the interrupt signal is not asserted;

accessing a particular memory bank from the plurality of memory banks with the microprocessor according to the selection signal.

20. The method of claim 19 wherein the microprocessor is an MCS series microprocessor.

21. The method of claim 19 further comprising storing a common area not comprising the interrupt service routine in each memory bank.

22. The method of claim 19 further comprising storing a program called by the interrupt service routine in the same memory bank as the interrupt service routine.

* * * * *